FREQUENCY CONTROLLED SEMICONDUCTOR JUNCTION LASER

Filed Sept. 24, 1964

Inventor:
Gunther E. Fenner,
by
His Attorney.

United States Patent Office 3,504,302
Patented Mar. 31, 1970

3,504,302

FREQUENCY CONTROLLED SEMICONDUCTOR JUNCTION LASER

Gunther E. Fenner, Schenectady, N.Y., assignor to General Electric Company, a corporation of New York Filed Sept. 24, 1964, Ser. No. 399,053
Int. Cl. H01s *3/18*; H04b *9/00*
U.S. Cl. 332—7.51 4 Claims

ABSTRACT OF THE DISCLOSURE

A semiconductor laser device having a continuous p-n junction region which receives forward bias at a first location and reverse bias at a second location spaced apart from the first location in the direction of energy propagation. The first location establishes oscillation between a pair of parallel reflecting faces which define a resonant cavity. Energization of the second location with a modulating signal produces corresponding frequency variations in the emitted coherent rediation while allowing intensity of the emitted radiation to remain essentially unaffected.

The present invention relates to the generation of stimulated coherent radiation of controllable energy, and more particularly pertains to means for controlling the frequency of such radiation from a semiconductor junction laser.

Semiconductor junction diodes adapted to provide generation of stimulated coherent radiation are described in an article entitled "Coherent Light Emission From P–N Junctions" appearing in Solid-State Electronics, vol. 6, page 405, (1963) that is intended to be incorporated herein by reference thereto. Diodes of this type are refered to herein, and in the appended claims, as semiconductor junction lasers.

The discovery of the semiconductor junction laser enabled more efficient generation of stimulated coherent radiation of light, not necessarily visible but infrared as well, and also of microwave frequencies, utilizing less complex equipment. In many applications of semiconductor junction lasers it is highly desirable to provide means for varying the frequency, or frequency spectrum, of the coherent radiation, for example, where frequency modulation is desired to transmit information or where the output frequency of the laser is to be closely matched with the frequency of an already existing system.

The frequency of a semiconductor junction laser can be controlled by mechanically stressing the laser crystal as described in my copending application entitled, "Frequency Control of Semiconductive Junction Lasers by Application of Force," Ser. No. 354,369 filed Mar. 24, 1964 and assigned to the assignee of the present application. While such frequency control is conveniently adapted for use with existing laser diodes and is advantageously employed under most conditions, there are applications where it would be desirable to obviate the inherent disadvantages of a mechanical frequency control and to use an electrical or electronic signal frequency control. For example, it may be important to reduce the physical size and weight of the source of coherent radiation or perhaps it is desirable to achieve more rapid variations of frequency than ordinarily obtainable with mechanical systems of frequency control. Of course, it is almost always preferred that any frequency control influence the amplitude or intensity of radiation as little as possible.

Accordingly, it is an object of the present invention to provide a source of stimulated coherent radiation having an electrically controllable output frequency.

Another object of this invention is to provide a semiconductor junction laser with an output spectrum that varies in frequency in accord with variations in the magnitude of an electric control current.

Still another object of this invention is to provide means for electrically modulating the output frequency of a semiconductor junction laser while maintaining the intensity of coherent radiation therefrom essentially constant.

Yet another object of this invention is to provide a readily fabricated and economical source of coherent radiation adapted to be frequency modulated in accord with variations in the magnitude of a relatively weak electric current.

Briefly stated, in accord with one embodiment of my invention, I provide a semiconductor junction laser wherein one continuous junction region is biased differently in two portions thereof that are spaced in the direction of energy propagation. The first portion of the junction region is strongly forward biased to provide the usual active laser region. This establishes a standing wave of electro-magnetic radiation throughout the junction region between a pair of parallel reflecting external surfaces of the laser body. Because the junction is continuous, strong forward biasing of the first portion thereof results in some incidental forward biasing of the second portion. I have discovered that by providing a backbiasing current to the second portion of the junction which substantially cancels such incidental forward biasing, an anomalous operating characteristic of frequency versus current is realized whereat large frequency variations in the coherent radiation are achieved by relatively small fluctuations in the magnitude of back-biasing current. In addition, the intensity of radiation remains essentially unaffected. Thus, frequency control is obtained by varying the magnitude of back-biasing current.

Preferably, the laser devices of this invention take the general form of a monocrystalline semiconductive body having degenerate p-type and n-type regions sandwiching a planar junction region that extends between two parallel faces that provide a resonant cavity. One of the degenerate regions is grooved, parallel to the faces, almost through to the junction region. The two partially separated parts thus formed provide convenient means for applying the two opposite bias currents to the junction region. In this way a frequency modulatable laser is provided without the scattering problems attendant use of a discontinuous junction region or the alignment and matching problems attendant use of two separate crystal bodies.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which:

Figure 1:
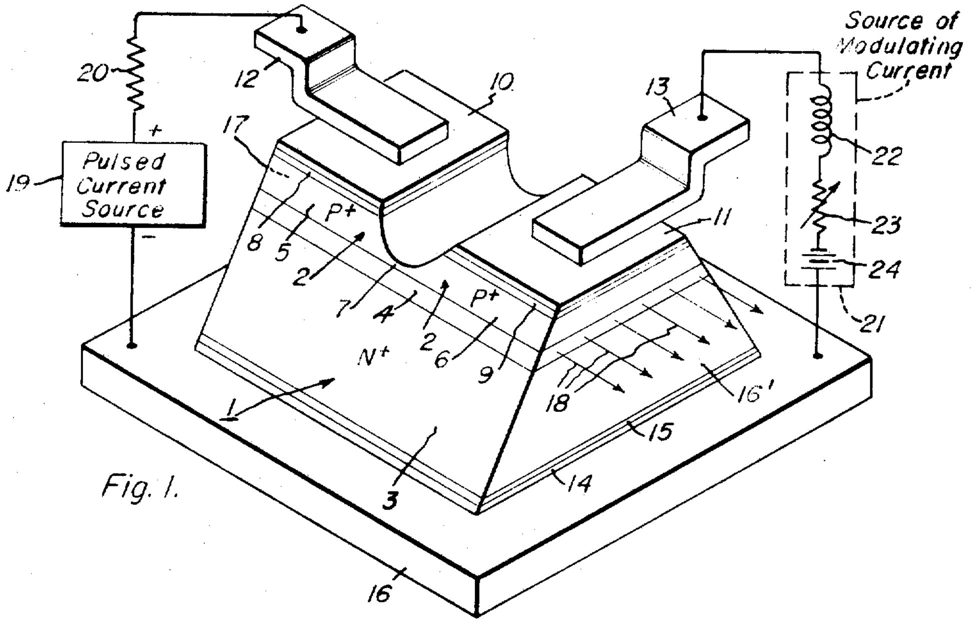
FIGURE 1 is a perspective view of a typical semiconductor junction laser constructed in accord with the invention.

While the present invention relates to semiconductor junction lasers generally, in the interest of clarity and brevity the illustrative embodiment of the invention shown in FIGURE 1 is selected to be a laser of the type wherein region is deposed between two parallel reflecting faces that form a resonant cavity. The device of FIGURE 1 comprises a monocrystalline body of semiconductive material, indicated generally at 1, having a degenerately impregnated, or doped, p-type region 2 and a degenerately impregnated, or doped, n-type region 3. Regions 2 and 3 are contiguous with and define a continuous intermediate p-n junction region 4 within body 1. In accord with the present invention, one of the two degenerate regions, selected to be p-type region 2 in the illustration, is divided into two parts 5 and 6 which are connected by a relatively thin bridge-portion 7 that is also an integral part of p-type region 2 and contiguous with region 4.

Non-rectifying contact is made between parts 5 and 6 by means of acceptor type or electrically neutral solder layers 8 and 9, respectively, which are joined to electrodes 10 and 11, respectively. Electrodes 10 and 11 are in turn connected to electrode connectors 12 and 13, respectively, as for example, by welding, brazing, etc. N-type region 3 is secured to an electrode 4 by means of a donor type or electrically neutral solder layer 15. Electrode 14 is in turn connected to an electrode connector 16 as, for example, by welding, brazing, etc. Preferably, electrode connector 16 is large and simultaneously serves as a base or mechanical support member for the laser structure.

Semiconductor body 1 is cut in such a manner that the front surface 16′ and back surface 17 thereof may be polished to exact parallelism in planes that are perpendicular to the plane of junction region 4. This parallelism is necessary in order that a standing wave pattern may be set up within the semiconductor crystal for the attainment of high efficiency coherent radiation emission 18 through at least one of faces 16′ and 17, shown as face 16′ in the drawing. In general, deviations from exact parallelism cause corresponding decreases in efficiency.

As illustrated in FIGURE 1 of the drawing, the semiconductor diode is activated to the emission of stimulated coherent radiation by application of a forward bias, as for example, by the connection to a source of direct current of sufficiently high current capacity to cause the production of coherent radiation. Such a pulsed source is illustrated schematically at 19 and is connected to the laser through a series current-limiting resistance 20. Source 19 is connected to electrical connectors 16 and 12, biasing the former negatively with respect to the latter. In this way, the portion of junction 4 between part 5 and region 3 constitutes the active region of the laser which is strongly forward biased. However, because junction region 4 is continuous, and owing in part to bridge 7, some of the portion of junction 4 between part 6 and region 3 is also forward biased, although less storngly.

In accord with the present invention the portion of junction 4 underlying part 6 is subjected to a reverse-biasing current as by source 21 indicated schematically as including an inductance 22, resistance 23, that is conveniently selected to be variable, and a voltage source 24, that can be a battery as illustrated schematically. Electrode connector 13 is connected to the negative terminal of source 21 and electrode connector 16 is connected to the positive terminal thereof. In this way, incidental forward biasing of the portion of junction region 4 between part 6 and region 3 is selectively reduced in magnitude by controlling the resistance value of resistance 23. By suitably reducing the resistance value the back-biasing current can be increased in magnitude to the extent that actual back-biasing of the junction region occurs.

Figure 2:
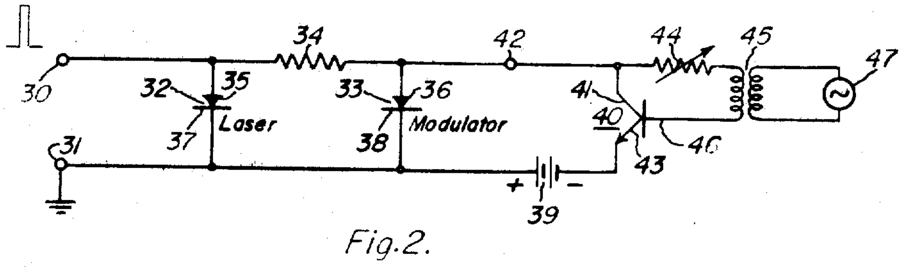
FIGURE 2 is an electrical equivalent schematic circuit diagram of the device of FIGURE 1 including a schematic diagram of a suitable source of modulating current; and, FIGURE 3 is a graph of frequency change versus modulating current for a typical laser in accord with the invention.

FIGURE 2 of the drawing includes a schematic representation of the equivalent circuit of the laser device shown in FIGURE 1. The circuit includes an input terminal 30, corresponding to electrode connector 12, and an input terminal 31, corresponding to electrode connector 16. Laser diode 32 corresponds to that portion of the device of FIGURE 1 including part 5 of p-type region 2, the portion of the junction 4 contiguous therewith and corresponding part of n-type region 3. Diode 33 represents essentially the remaining half of the device of FIGURE 1 including part 6 of the p-type region 2, the portion of junction region 4 contiguous therewith and corresponding underlying portion of n-type region 3.

The electrical connection between the two portions of junction region 4 is represented by a leakage resistance 34 interconnecting anodes 35 and 36 of diodes 32 and 33, respectively. The corresponding cathodes 37 and 38 of respective diodes 32 and 33 are connected directly together and to terminal 31. The magnitude of resistance 34 depends largely upon the thickness of bridge part 7 of p-type region 2. A typical value is 10 ohms, although, this resistance value varies widely depending upon the particular semiconductive material used, the extent of impurity impregnation, or doping, etc.

A source of back-biasing current for the equivalent circuit of FIGURE 2 is shown schematically to include a voltage source 39, that can be a battery as shown, connected in series with an NPN-type transistor 40. Collector 41 of transistor 40 is connected to a terminal 42 corresponding to electrode connector 13 in FIGURE 1. The emitter 43 of transistor 40 is connected to the negative terminal of source 39 and the positive terminal of source 39 is conductively connected to input terminal 31. Means for controlling the modulating current include a variable resistance 44 connected in series with a coupling means 45, that can be the primary of a transformer as shown schematically, from collector 41 to base 46 of transistor 40. The primary of transformer 45 is in turn connected to a source 47 of desired modulating electrical energy. In operation, variable resistance 44 is used to set the steady-state or direct current bias of diode 33, about which bias point current is caused to fluctuate in accord with energy supplied by source 47.

For typical operation in accord with the present invention, the magnitude of back-biasing current is adjusted to substantially cancel, or eliminate, the forward-biasing of diode 33 incidental to leakage from diode 32 when the latter is energized to provide coherent radiation. This provides operation of the modulator near the point 50 of characteristic curve 51 shown in FIGURE 3, when approximately linear frequency modulation with an alternating current source is desired. I have discovered that characteristic curve 51 slopes steeply as shown near its original, rather than gradually, as was expected, in accord with dashed curve 52. Thus, small changes in modulating current provide substantial frequency shift in the output spectrum of coherent radiation emitted from a laser device as shown in FIGURE 1. Sensitivities in the order of 1 kmc. frequency variation for each 10 milliampere variation of modulating current magnitude are readily obtained.

Figure 3:
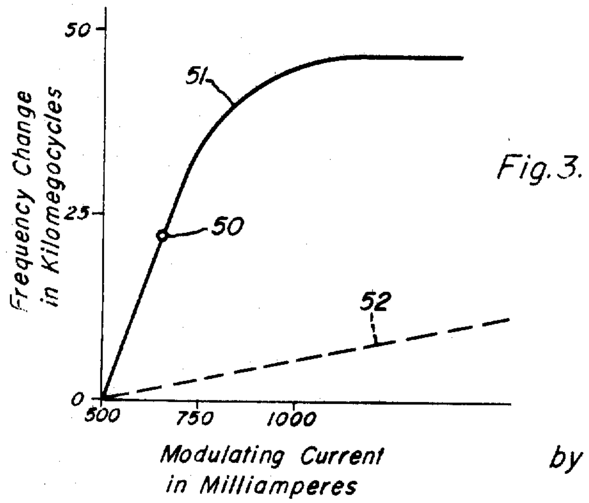

FIGURE 3 illustrates the typical characteristic of a diode at 77° K., with an incidental forward biasing of the modulator equal to about 500 milliamperes. Of course, with devices operated at lower temperatures, or with devices featuring greater isolation between the lasing and modulating sections, the incidental forward biasing of the modulator section may fall below mid-point 50 on the substantially linear origin portion of the frequency versus modulating current characteristic. In such event, a slight forward bias of the modulator is required when operation about point 50 is desired.

The material from which the semiconductor crystal body 1 is cut may be composed in general of a compound semiconductor or an alloy of compound semiconductors from the Group III–Group V (of the periodic table) class which are denominated as Direct Transition Semiconductors (adapted to direct transitions of electrons between valence and conduction bands) and may include, for example, gallium arsenide, indium antimonide, indium arsenide, indium phosphide, gallium antimonide and alloys therebetween and may further include direct transition alloys of other materials such as alloys of gallium arsenide and gallium phosphide (indirect by itself) in the range of zero to approximately 50 atomic percent of gallium phosphide. For a further discussion of direct transition semiconductors reference is hereby made to an article by H. Ehrenreich in the Journal of Applied Physics, vol. 32, pages 2155 (1961). Other suitable direct transition semiconductive materials include lead sulfide, lead selenide and lead telluride. In these latter materials indium is suitable as a donor and excess anion is suitable as an acceptor. The wavelength of the emitted radiation depends upon the band gap (the energy difference between the conduction band and the valence band of the chosen semiconductor).

Both the n-type and the p-type regions of semiconductor crystal 1 are impregnated or doped with donor or acceptor activators, respectively, to cause degeneracy therein. As used herein, a body may be considered to be degenerate n-type when it contains a sufficient concentration of excess donor impurity carriers to raise the Fermi level thereof to a value of energy higher than the minimum energy of the conduction band on the energy band diagram on the semiconductive material. In a p-type semiconductor body or region, degeneracy means that a sufficient concentration of excess acceptor impurity carriers exists therein to depres the Fermi level to an energy lower than the maximum energy of the valence band on the energy band diagram for the semiconductive material. Degeneracy is usually obtainable when the excess negative conduction carrier concentration exceeds $10^{17}$ per cubic centimeter or when the excess positive conduction carrier concentration exceeds $10^{18}$ per cubic centimeter. The Fermi level of such an energy band diagram is that energy at which the probability of there being an electron present in a particular state is equal to one half.

The materials suitable for rendering degenerately n- and p-type the various semiconductor with which the devices of the present invention may be constructed depend upon the semiconductive material utilized and are not necessarily the same in each case, even though the materials may be of the same class. Thus all of the Group III–Group V periodic table compounds utilize sulfur, selenium and tellurium as donors and zinc, cadmium, mercury and magnesium as acceptors, on the other hand, the elements tin, germanium and silicon may serve either as donors or acceptors depending upon the particular semiconductor and the method of preparation. For example, in gallium antimonide grown from a stoichiometric melt they are all acceptors. In indium antimonide, tin is a donor, whereas germanium and silicon are acceptors. In the remaining direct transition semiconductors of the Group III–Group V type, Sn, Ge and Si are all donors. Any donor and acceptor pair that have sufficiently high solubilities for the material utiliezd to form crystal 1 may be utilized as to form the degenerately impregnated or doped regions 2 and 3 in the device of FIGURE 1.

As an example of one device constructed in accord with the present invention, a device substantially as illustrated in FIGURE 1 was made of a flat wafer cut from a monocrystalline ingot of n-type gallium arsenide which had been impregnated or doped with approximately $10^{18}$ atoms per cubic centimeter or tellurium by growth from a melt of gallium arsenide containing at least $5 \times 10^{18}$ atoms per cubic centimeter of tellurium to cause it to be degenerately n-type. A p-n junction region is formed in a horizontal plane by diffusing zinc into all surfaces thereof at a temperature of approximately 1000° C. for approximately ½ hour using an evacuated sealed quartz tube containing the gallium arsenide crystal and 10 milligrams of zinc, thus producing a p-n junction region of approximately 1000 angstroms in thickness at a distance of approximately .1 millimeter below all surfaces of the crystal 1. The wafer is then cut and ground to remove all except one such planar junction. As cut, the wafer typically may be .5 millimeter thick and .4 millimeter x .4 millimeter on its faces. The front and rear surfaces of the crystal which are perpendicular to the p-n junction are then polished to optical smoothness and to exact parallelism (in the case of the aforementioned gallium arsenide diode to a parallelism of approimately ±0.1 micron). Alternatively, parallelism may be obtained by proper cleavage of the crystal. The side surfaces are cut so as to form a tapered structure as one means of precluding any possibility of transverse standing waves within the semiconductor crystal. Alternatively, they could be roughened with abrasive for the same purpose. With the aforementioned GaAs crystal, acceptor solder is an alloy of three weight percent zinc, the remainder being indium. Donor solder is of tin.

By a thin junction region, as used herein and in the appended claims, it is intended to specify a thickness of the junction region in crystal 1 of approximately 300 to 20,000 angstrom units as determined from measurements of junction capacity at zero bias and preferably should be maintained at a thickness of approximately 500 to 2000 angstroms. This thickness determines the efficiency of light generation and the threshold current for coherent light, and may determine the feasibility of operating the diode on a continuous wave basis. It also is important in determining the temperature of operation and the power output. Phenomenologically, the minimum thickness is set by practical considerations and may be any small but finite dimension which does not allow appreciable quantum mechanical tunneling under forward bias. The maximum thickness of the layer should not exceed approximately twice the longer of the two minority charge carrier diffusion lengths on either side of the intermediate or junction region.

To adapt the semiconductor junction laser for use in accord with the present invention, a device as set forth above is provided with a separating groove or the like which is etched, sawed or otherwise formed in one of the degenerate regions parallel to the reflecting faces. In this way the selected region is divided into two parts spaced in the direction of wave propagation to define corresponding underlying portions of the junction region. It is necessary that the groove not extend into the junction region to avoid scattering loss in the device. Otherwise, the thickness of the bridge connecting the parts can be made as thin as possible.

With a gallium arsenide device, the groove is readily formed by etching in a solution of, for example, three parts concentrated nitric acid to one part of 30 percent hydrofluoric acid, after masking portions not to be etched with a suitable inert material, as black wax ("Apiezon W"), or other well-known masking substances for the purpose. The etching is preferably conducted in a plurality of steps, typically from three to ten, between which the resistance from one part to the other of the region being grooved is measured. During each step the device is exposed to the etching solution for approximately one second and then quickly rinsed in water. A typical starting resistance is about 0.2 ohm and a suitable device is completed when the resistance is about one ohm or more. The masking material is dissolved in a suitable solvent therefor, resulting in a device as shown in FIGURE 1.

In operation, the device of FIGURE 1 is subjected to a pulse of direct current at high current levels, as for example, of approximately 2,000 to 20,000 amperes per square centimeter for a gallium arsenide diode. The pulse width to avoid overheating is conveniently kept to a level of approximately 1 to 10 microseconds. Since it has been found that the threshold for stimulated coherent light emission from a gallium arsenide diode, for example, is related to the temperature of the diode, it may be convenient to subject the diode to a low temperature to lower the threshold for coherent emission and preclude the necessity of a high current source. Thus, for example, when a diode of gallium arsenide is immersed in a dewar of liquid air at a temperature of approximately 77° K. the threshold for coherent emission occurs at approximately 10,000 amperes per square centimeter and decreases to less than 2000 amperes per square centimeter at 20° K. Since the junction area may conveniently be approximately .0005 square centimeter, a two ampere pulsed current source is sufficient at 77° K. as is a 0.4 ampere source at 20° K.

In order to provide efficient frequency modulation, the magnitude of back-biasing frequency control current is adjusted to substantially cancel the incidental forward-biasing current in the modulating portion of the junction, as indicated by an approximately zero difference in electric potential across the modulating portion. Thus, by the term "back-biasing" it is intended to designate the polarity of the current and not its effect upon the junction, although the frequency modulating portion of the junction can be advantageously back-biased slightly in some applications. Thereafter, small fluctuations in the magnitude of control current provide large and substantially linear frequency modulation of the coherent output radiation as shown in FIGURE 3, which is an illustrative plot of the response of a device fabricated as set forth above.

There has been shown and described herein a semiconductor junction laser having a coherent output spectrum that can be varied in accord with variations in the magnitude of an electric current. Lasers in accord with the invention are readily fabricated and simple to operate efficiently. The infirmities of a system utilizing two independent, closely matched crystal diode bodies with antireflecting coatings on adjacent surfaces, that must be painstakingly aligned, are obviated. In addition, the continuous junction region, characteristic of devices in accord with the invention, eliminates inefficiencies of devices having even very slight discontinuities in their junctions.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What I claim as new and desire to secure by Letters Patent of the United States is:

1. A semiconductor junction laser device for providing coherent radiation of controllable energy, said device comprising:

(a) a monocrystalline body of direct transition semiconductive material having degenerate p-type and n-type regions contiguous with and defining an intermediate thin p-n junction region in said body extending linearly in at least one direction between opposed substantially parallel reflecting surfaces of said body defining a resonant cavity;

(b) means for forward biasing a first portion of said p-n junction region to establish a population inversion and a standing wave of electromagnetic energy in said p-n junction region between said parallel reflecting surfaces; and, (c) means for controllably biasing a second portion of said p-n junction region that is spaced in said one direction from said first portion so as to controllably vary the frequency of said standing wave of electromagnetic energy.

2. The device of claim 1 wherein one of said p-type and n-type regions comprises first and second major parts contiguous with the first and second portions, respectively, of said p-n junction region and said parts are joined by an integral relatively thin bridge part that is contiguous with said p-n junction region intermediate said first and second portions thereof.

3. A source of frequency modulated coherent radiation comprising:

(a) a monocrystalline body of direct transition semiconductive material having two opposing parallel external faces adapted to permit standing waves of electromagnetic energy to be sustained therebetween;

(b) a first region within said body having degenerate conductivity characteristics of one type;

(c) a second region within said body having degenerate conductivity characteristics opposite to that of said one type;

(d) a thin junction third region contiguous with and intermediate said first and second regions extending linearly at least in the direction perpendicular to said parallel faces;

(e) first and second ohmic contacts on said first region spaced in said direction;

(f) means including the first of said contacts for applying a first unidirectional current to said body sufficient to bias a first portion of said third region in the forward direction to establish a population inversion and standing waves of coherent electromagnetic energy in said third region between said parallel faces; and (g) means including the second of said contacts for applying a second unidirectional current of controllable magnitude to said body in the opposite direction from said first unidirectional current to provide corresponding variation in the refractive index of a second portion of said third region, said second unidirectional current substantially cancelling the incidental effect of said first unidirectional current in the second portion of said junction region to provide frequency modulation of said coherent emission without substantial amplitude modulation thereof in accord with said fluctuations.

4. A source of coherent light adapted to be frequency modulated in accord with variations in the magnitude of an electric current, said source comprising:

(a) a p-n junction semiconductor laser including a monocrystalline body of direct transition semiconductive material having degenerate p-type and n-type regions contiguous with and defining an intermediate thin p-n junction region extending linearly in at least one direction between opposed first and second parallel surfaces of said body, said surfaces being at least partially reflecting and essentially perpendicular to said junction region;

(b) first means for injecting electrons into a first portion of said junction region at a rate sufficient to create a population inversion therein and emission of coherent radiation through at least one of said surfaces; and, (c) second means for collecting electrons from a secone portion of said junction region at a rate that varies in accord with variations in the magnitude of said electric current, said electric current comprising a component having a magnitude that is selected to substantially cancel the effect of electrons which leak from said first means into said second portion of said p-n junction region.

References Cited

UNITED STATES PATENTS

| | | | |
|---|---|---|---|
| 3,005,937 | 10/1961 | Wallmark et al. | 307—88.5 |
| 3,245,002 | 4/1966 | Hall | 332—7.51 X |

(Other references on following page)

UNITED STATES PATENTS

| | | | |
|---|---|---|---|
| 3,257,626 | 6/1966 | Marinace et al. | 331—94.5 |
| 3,312,910 | 4/1967 | Offner | 332—7.51 X |
| 3,340,479 | 9/1967 | Ashkin | 331—94.5 |

OTHER REFERENCES

Hall et al., Physical Review Ltrs., vol. 9, No. 9, Nov. 1, 1962.

Wallmark et al., R.C.A. Engineers—4th Ann. Issue), July, 1959, pp. 42–45.

Stevenson et al., IBM Journal, April 1963, pp. 155–156.

ALFRED L. BRODY, Primary Examiner

U.S. Cl. X.R.

250—199; 307—312; 330—4.3; 331—94.5